US012528286B2

(12) United States Patent
Kusunoki et al.

(10) Patent No.: US 12,528,286 B2
(45) Date of Patent: Jan. 20, 2026

(54) INKJET RECORDING APPARATUS

(71) Applicant: KYOCERA Document Solutions Inc., Osaka (JP)

(72) Inventors: Yoshiya Kusunoki, Osaka (JP); Yuzuru Yuasa, Osaka (JP); Yusuke Tamekuni, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 149 days.

(21) Appl. No.: 18/639,356

(22) Filed: Apr. 18, 2024

(65) Prior Publication Data

US 2024/0351330 A1 Oct. 24, 2024

(30) Foreign Application Priority Data

Apr. 20, 2023 (JP) ................................ 2023-069214

(51) Int. Cl.
*B41J 2/165* (2006.01)
*B41J 2/025* (2006.01)
*B41J 29/393* (2006.01)

(52) U.S. Cl.
CPC ........... *B41J 2/025* (2013.01); *B41J 2/16505* (2013.01); *B41J 29/393* (2013.01)

(58) Field of Classification Search
CPC ...... B41J 2/025; B41J 2/16505; B41J 29/393; B41J 2/165
See application file for complete search history.

(56) References Cited

U.S. PATENT DOCUMENTS

2007/0216720 A1* 9/2007 Akase ...................... B41J 2/165 347/22
2024/0294007 A1* 9/2024 Sasaki .................. B41J 2/16585

FOREIGN PATENT DOCUMENTS

JP 2004074590 A * 3/2004
JP 2004-291457 A 10/2004

* cited by examiner

*Primary Examiner* — Sharon Polk
(74) *Attorney, Agent, or Firm* — Stein IP, LLC

(57) ABSTRACT

The inkjet recording apparatus includes a recording head, a cap member, a humidifying part for humidifying interior of the cap member, a cap moving mechanism, a controller, and a storage part. The storage part has stored a non-capping period table in which a number of vibrations of ink level within each nozzle is increased based on a non-capping period of an ink ejection surface, and a capping period table in which the number of vibrations is decreased based on a capping period of the ink ejection surface. In response to respective lengths of the non-capping period and the capping period from an end of ink ejection until a start of next ink ejection, the controller sets the number of vibrations at a start time of next ink ejection by using the non-capping period table and the capping period table.

5 Claims, 8 Drawing Sheets

FIG.8

81

| ELAPSED TIME t (s) | NUMBER Y OF VIBRATIONS (vibrations) |
|---|---|
| 1 | 10 |
| 2 | 20 |
| 3 | 30 |
| ⋮ | ⋮ |
| 1000 | 1000 |

FIG.9

82

| ELAPSED TIME t (s) | NUMBER Y OF VIBRATIONS (vibrations) |
|---|---|
| 0 | 1000 |
| 300 | 700 |
| 600 | 400 |
| 1200 | 200 |
| 2400 | 100 |
| 3600 | 0 |

82A

| ELAPSED TIME t (s) | NUMBER Y OF VIBRATIONS (vibrations) |
|---|---|
| 0 | 1500 |
| 300 | 1000 |
| 600 | 500 |
| 1200 | 200 |
| 2400 | 100 |
| 3600 | 0 |

FIG.12

82B

| ELAPSED TIME t (s) | NUMBER Y OF VIBRATIONS (vibrations) |
|---|---|
| 0 | 4500 |
| 3600 | 4000 |
| 7200 | 3000 |
| 10800 | 2000 |
| 14400 | 1000 |
| 18000 | 0 |

FIG.13

82C

| ELAPSED TIME t (s) | NUMBER Y OF VIBRATIONS (vibrations) |
|---|---|
| 0 | 4500 |
| 43200 | 4000 |
| 86400 | 3000 |
| 129600 | 2000 |
| 172800 | 1000 |
| 216000 | 0 |

FIG.14

82D

| ELAPSED TIME t (s) | NUMBER Y OF VIBRATIONS (vibrations) |
|---|---|
| 1 | 10000 |
| 2 | 5000 |
| 3 | 1000 |
| ⋮ | ⋮ |
| 100 | 0 |

FIG.15

81A

| ELAPSED TIME t (s) | NUMBER Y OF VIBRATIONS (vibrations) |
|---|---|
| 1 | 10 |
| 2 | 100 |
| 3 | 1000 |
| ⋮ | ⋮ |
| 100 | 10000 |

INKJET RECORDING APPARATUS

INCORPORATION BY REFERENCE

This application is based on and claims the benefit of priority from Japanese Patent Application No. 2023-069214 filed on Apr. 20, 2023, the contents of which are hereby incorporated by reference.

BACKGROUND

The present disclosure relates to an inkjet recording apparatus.

As recording apparatuses such as printers and copiers, inkjet recording apparatuses that eject ink onto paper or other recording mediums to record images have been widely used by virtue of their high-definition image recordability. With such inkjet recording apparatuses, there is a possibility that thickening of ink within nozzles provided in recording heads may occur due to drying or the like, causing an ejection failure. As countermeasures against this to suppress thickening of ink within the nozzles, such prior arts are known as meniscus fluctuation, capping, and in-cap humidification in connection with recording heads or nozzles.

SUMMARY

An inkjet recording apparatus according to one aspect of the present disclosure includes a recording head, a head driving part, a cap member, a humidifying part, a cap moving mechanism, a controller, and a storage part. The recording head has an ink ejection surface in which nozzles for ejecting ink onto a recording medium are opened. The head driving part vibrates a liquid level of ink within each nozzle to generate ink drops. The cap member is settable to and removable from the ink ejection surface and covers the ink ejection surface. The humidifying part humidifies interior of the cap member. The cap moving mechanism moves the cap member selectively between a capping position for coverage of the ink ejection surface and a non-capping position for retraction from the ink ejection surface. The controller controls operations of the recording head, the head driving part, the humidifying part, and the cap moving mechanism. The storage part has stored control tables related to operations of the head driving part and the cap moving mechanism. The controller is enabled to execute pre-ejection vibrations for vibrating the liquid level to a specified times of vibrations without executing ink ejection at a start time of ink ejection from the nozzles. The control tables include a non-capping period table in which the number of vibrations is increased based on a non-capping period of the ink ejection surface and a capping period table in which the number of vibrations is decreased based on a capping period of the ink ejection surface. In response to respective lengths of the non-capping period and the capping period from an end of ink ejection through the nozzles until a start of next ink ejection, the controller sets the number of vibrations for the pre-ejection vibrations at a start time of next ink ejection by using the non-capping period table and the capping period table.

BRIEF DESCRIPTION OF THE DRAWINGS

FIG. 8 is a view showing an example of non-capping period table;

FIG. 9 is a view showing an example of capping period table;

FIG. 12 is a view showing an example of a second capping period table of FIG. 10;

FIG. 13 is a view showing an example of a third capping period table of FIG. 10;

FIG. 14 is a view showing an example of capping period table in an inkjet recording apparatus according to Modification 2; and FIG. 15 is a view showing an example of non-capping period table in the inkjet recording apparatus of Modification 2.

DETAILED DESCRIPTION

Hereinafter, an embodiment of the present disclosure will be described with reference to the accompanying drawings. It is to be noted that the present disclosure is not limited to the following contents.

Figure 1:
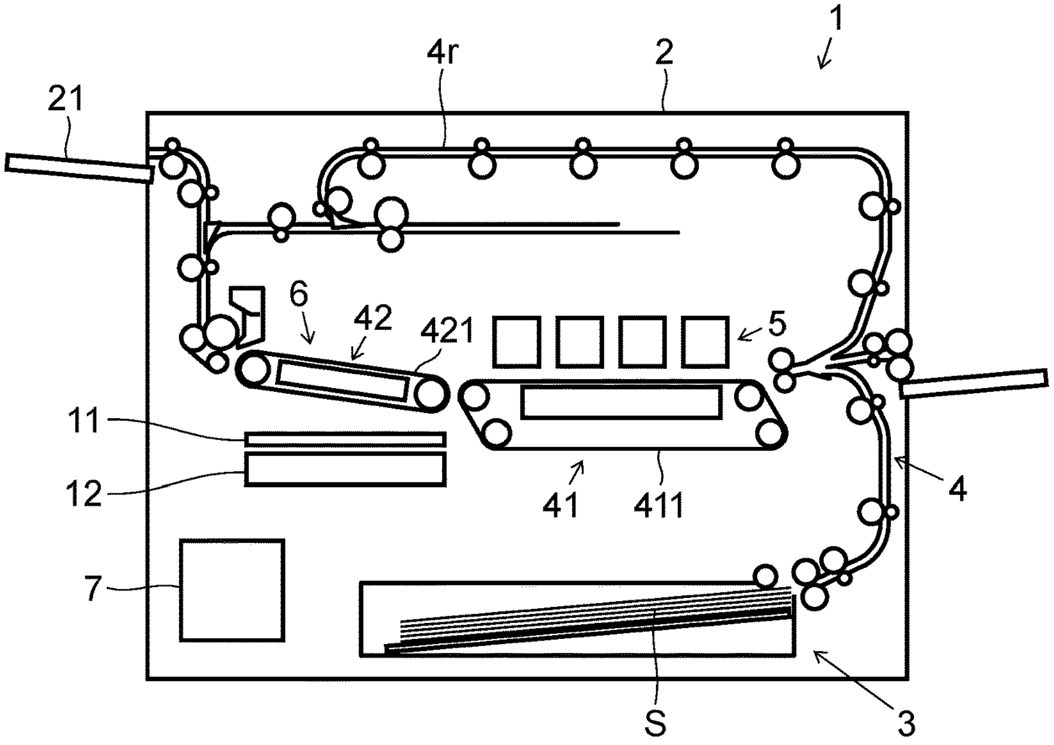
FIG. 1 is a schematic cross-sectional front view of an inkjet recording apparatus according to an embodiment of this disclosure.
Figure 2:
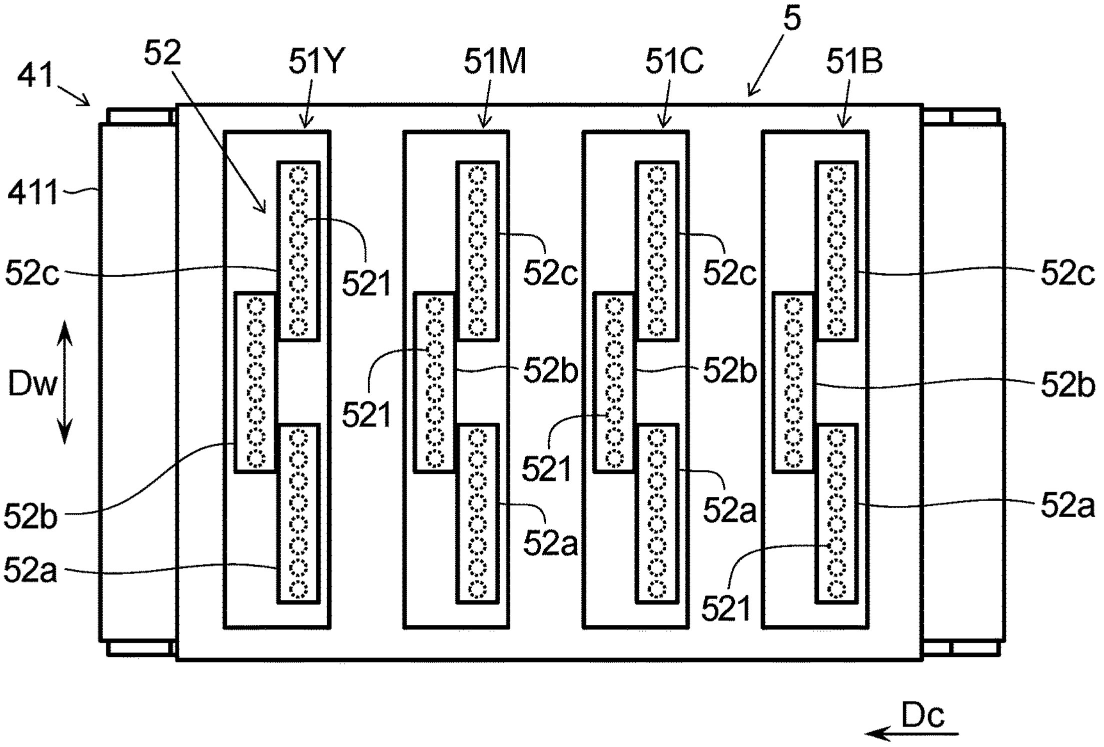
FIG. 2 is a plan view of around a recording part in the inkjet recording apparatus of FIG. 1.
Figure 3:
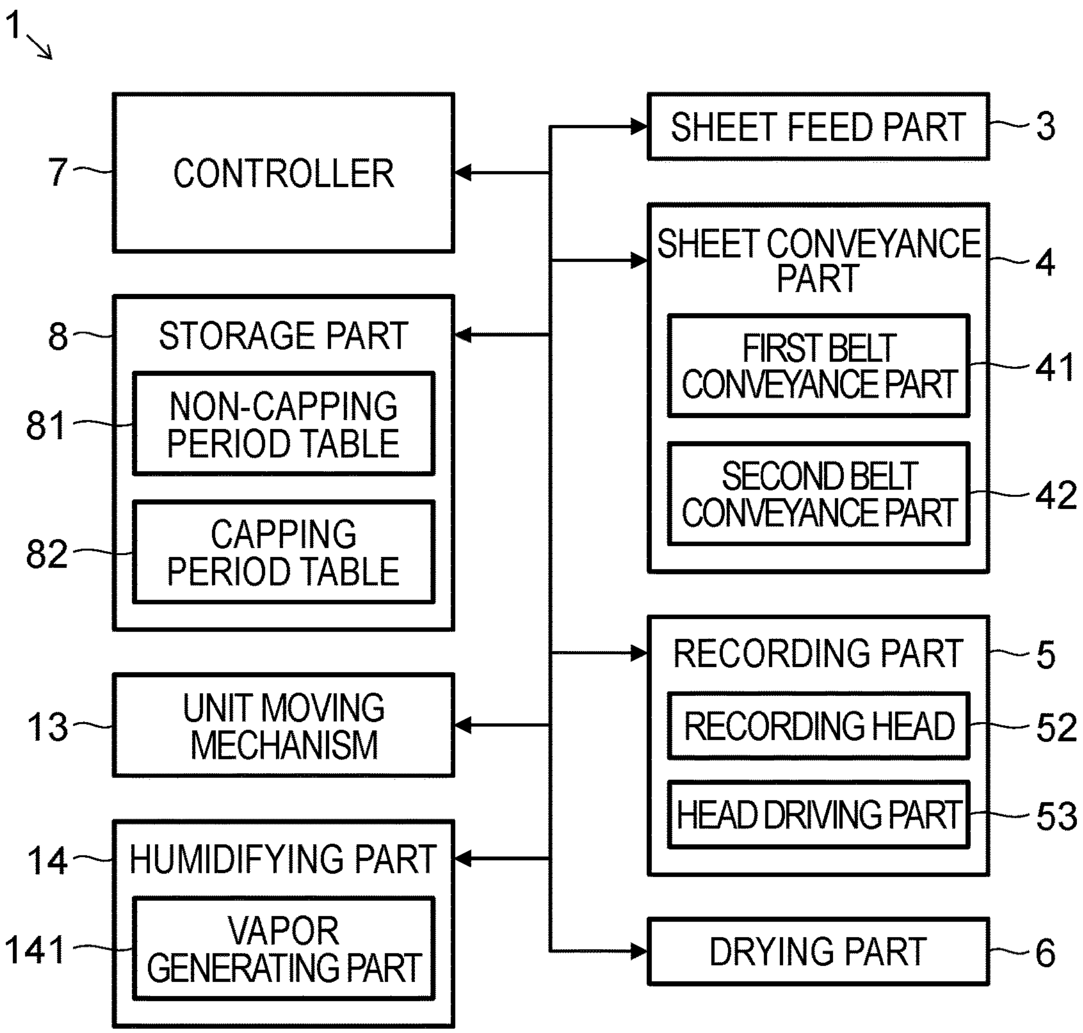
FIG. 3 is a block diagram showing a schematic configuration of the inkjet recording apparatus of FIG. 1.

FIG. 1 is a schematic cross-sectional front view of an inkjet recording apparatus 1 according to an embodiment. FIG. 2 is a plan view of around a recording part 5 in the inkjet recording apparatus 1 of FIG. 1. FIG. 3 is a block diagram showing a schematic configuration of the inkjet recording apparatus 1 of FIG. 1. The inkjet recording apparatus 1 is a printer of inkjet recording type, as an example. As shown in FIGS. 1, 2 and 3, the inkjet recording apparatus 1 includes an apparatus housing 2, a sheet feed part 3, a sheet conveyance part 4, a recording part 5, a drying part 6, a controller 7, and a storage part 8.

The sheet feed part 3 is placed in lower part of the apparatus housing 2, as an example. The sheet feed part 3, in which a plurality of paper sheets (recording medium) S are contained, separates and feeds out sheets S one by one in recording process.

The sheet conveyance part 4, which is placed downstream of the sheet feed part 3 in a sheet conveyance direction, conveys a sheet S that has been fed out from the sheet feed part 3. The sheet conveyance part 4 conveys the sheet S to the recording part 5 and the drying part 6, and moreover discharges the sheet S, which has been subjected to recording and drying, to a sheet discharge part 21. The sheet conveyance part 4 includes, for example, a reversal conveyance part 4*r*. In a case where double-sided recording is executed, the sheet conveyance part 4 assorts a sheet S, whose first surface has been subjected to recording and drying, to the reversal conveyance part 4*r* and, with a conveyance direction switched over, further conveys the top/bottom reversed sheet S once again to the recording part 5 and the drying part 6.

The sheet conveyance part 4 includes a first belt conveyance part 41 and a second belt conveyance part 42. The first belt conveyance part 41 has a first conveyor belt 411 formed into an endless shape. The second belt conveyance part 42 has a second conveyor belt 421 formed into an endless shape. The first belt conveyance part 41 and the second belt conveyance part 42 each convey a sheet S on their upper-side outer surface (top surface) while maintaining the sheet S in a sucked-and-held state. The first belt conveyance part 41 is placed below the recording part 5 to convey the sheet S. The second belt conveyance part 42 is positioned downstream of the first belt conveyance part 41 in the sheet conveyance direction, and placed at the drying part 6 to convey the sheet S.

The recording part 5 is positioned downstream of the sheet feed part 3 in the sheet conveyance direction, and placed in opposition to the first belt conveyance part 41. The recording part 5 is placed, with a specified clearance, above the first conveyor belt 411 so as to be opposed to a sheet S conveyed in a sucked-and-held state on the top face of the first conveyor belt 411. That is, the recording part 5 faces the sheet S that is being conveyed by the sheet conveyance part 4.

The recording part 5, as shown in FIG. 2, holds head units 51B, 51C, 51M, 51Y corresponding to four colors of black, cyan, magenta and yellow, respectively. The head units 51B, 51C, 51M, 51Y are juxtaposed in succession along a sheet conveyance direction Dc so that their longitudinal direction becomes parallel to a sheet widthwise direction Dw perpendicular to the sheet conveyance direction Dc. In addition, since the four head units 51B, 51C, 51M, 51Y are identical in basic configuration thereamong, identification signs 'B', 'C', 'M', 'Y' representing individual colors may be omitted hereinafter except that those signs need to be particularly limited.

Each head unit 51 for each individual color has line-type inkjet recording heads 52. In each individual-color head unit 51, a plurality (e.g., three (52*a*, 52*b*, 52*c*)) of recording heads 52 are arranged in a staggered shape along the sheet widthwise direction Dw.

Each recording head 52 has a plurality of ink ejection nozzles 521 at its bottom portion. The plurality of ink ejection nozzles 521 are placed in arrays along the sheet widthwise direction Dw, and enabled to eject ink over a whole recording region on the sheet S. That is, the recording head 52 has a plurality of ink ejection nozzles 521 for ejecting ink onto the sheet S. In the recording part 5, ink is ejected from the recording heads 52 of the four-color head units 51B, 51C, 51M, 51Y, respectively and sequentially, toward the sheet S being conveyed by the first conveyor belt 411, by which a full-color image or a monochrome image is recorded on the sheet S.

The drying part 6 is placed downstream of the recording part 5 in the sheet conveyance direction, and equipped with the second belt conveyance part 42. The sheet S, on which an ink image has been recorded in the recording part 5, has ink dried thereon while being conveyed as it is sucked and held on the second conveyor belt 421 in the drying part 6.

The controller 7 includes a CPU as well as other electronic circuits and electronic components (none shown). Based on control programs and data stored in the storage part 8, the CPU controls operations of individual component elements provided in the inkjet recording apparatus 1 to execute processing related to functions of the inkjet recording apparatus 1. The sheet feed part 3, the sheet conveyance part 4, the recording part 5 and the drying part 6, upon receiving instructions individually from the controller 7, execute recording onto the sheet S in linkage with one another.

The storage part 8 consists of, for example, a combination of nonvolatile storage, such as program ROM (Read Only Memory) and data ROM, and volatile storage, such as RAM (Random Access Memory).

Figure 4:
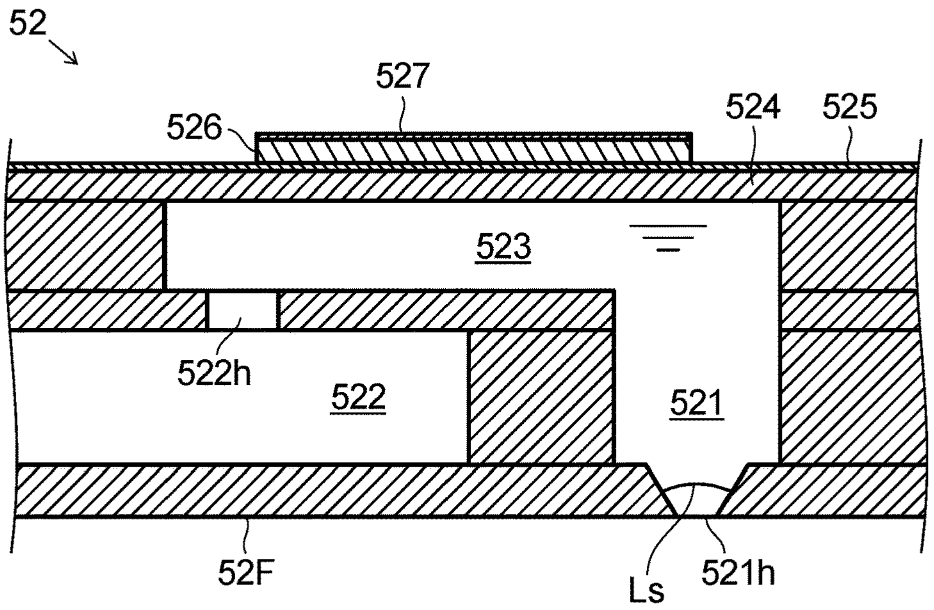
FIG. 4 is a partly enlarged vertical-cross-sectional view of a recording head in the recording part of FIG. 2.

Next, a configuration of each recording head 52 in the recording part 5 will be described with reference to FIG. 4. FIG. 4 is a partly enlarged vertical-cross-sectional view of a recording head 52 in the recording part 5 of FIG. 2. In addition, since the individual-color three recording heads 52*a*, 52*b*, 52*c* are identical in shape and configuration thereamong, identification signs (a, b, c) will be omitted hereinafter.

Each recording head 52 has an ink ejection surface 52F at its lower surface. The ink ejection surface 52F is opposed to a surface (top surface) of the sheet S being conveyed on the first conveyor belt 411. Opened in the ink ejection surface 52F are nozzle holes 521*h* of plural ink ejection nozzles 521 for ejecting ink onto the sheet S. The plural nozzle holes 521*h* are placed over a whole recording region on the sheet S in the sheet widthwise direction Dw (see FIG. 2) of the ink ejection surface 52F. Also formed in the ink ejection surface 52F is water-repellent film (not shown).

The recording head 52 further includes a common channel 522, a plurality of pressurizing chambers 523, a vibrating plate 524, a common electrode 525, a plurality of piezoelectric elements (vibrating elements) 526, and a plurality of discrete electrodes 527.

The common channel 522 is placed inside the recording head 52. The common channel 522 is connected to ink tanks (not shown) outside the head unit 51. Four-color inks stored in ink tanks are fed to the four-color (black, cyan, magenta and yellow) recording heads 52, individually and respectively.

Each of plural pressurizing chambers 523 adjoins the common channel 522 and is communicated with the common channel 522 via a feed hole 522*h*. Ink is fed from the common channel 522 through the feed hole 522*h* into the pressurizing chamber 523. Each of the ink ejection nozzles 521 is communicated with the pressurizing chamber 523 on a lower side of the pressurizing chamber 523 as in this embodiment, and a nozzle hole 521*h* is opened in the lower-end ink ejection surface 52F. The plurality of pressurizing chambers 523 are provided in correspondence to the plurality of ink ejection nozzles 521, respectively. That is, the plurality of pressurizing chambers 523 are capable of containing ink internally and communicated with the plurality of ink ejection nozzles 521, respectively.

The vibrating plate 524 is positioned at a wall portion opposite the ink ejection surface 52F with the pressurizing chamber 523 interposed therebetween. That is, the vibrating plate 524 is positioned on an upper side of the pressurizing chamber 523 in this embodiment. The vibrating plate 524 is placed so as to continue over a plurality of pressurizing chambers 523. The common electrode 525 is layered on a surface of the vibrating plate 524 so as to continue over a plurality of pressurizing chambers 523.

A plurality of piezoelectric elements 526 are placed on the surface of the common electrode 525. The plurality of piezoelectric elements 526 are provided discretely in adjacency to the plurality of pressurizing chambers 523. The plurality of discrete electrodes 527 are provided on surfaces of the plural piezoelectric elements 526 discretely in correspondence to the plurality of pressurizing chambers 523, respectively. That is, the plurality of discrete electrodes 527 are placed in opposition to the common electrode 525 with the plurality of piezoelectric elements 526 interposed therebetween, respectively. Each of the plural piezoelectric elements 526 pressurizes ink within its adjoining pressurizing chamber 523 so as to make the ink ejected through the ink ejection nozzle 521.

The recording part 5 also includes a head driving part 53. The head driving part 53 drives each recording head 52 on a basis of a control signal derived from the controller 7. In response to image data received from an external computer, the head driving part 53 makes ink ejected through the ink ejection nozzles 521 toward the sheet S being conveyed by the first conveyor belt 411. As a result, a color image in which four-color inks of black, cyan, magenta and yellow have been superimposed together, or a monochrome image, is formed on the sheet S on the first conveyor belt 411.

In more detail, the head driving part 53 applies a drive signal of a specified drive waveform and a drive voltage to each of the plural discrete electrodes 527. This operation allows the plural piezoelectric elements 526 to be discretely driven, respectively. Force generated by the piezoelectric elements 526 is applied to the vibrating plate 524, so that deformation of the vibrating plate 524 causes the pressurizing chambers 523 to be compressed. Then, ink within the pressurizing chambers 523 is pressurized so as to be moved into the ink ejection nozzles 521 and ejected through the nozzle holes 521*h* in the form of ink drops. In this way, the head driving part 53 makes ink levels Ls within the ink ejection nozzles 521, which allow ink to be ejected therethrough, vibrated until ink drops are generated.

In addition, drive waveforms of the piezoelectric elements 526 are prepared in advance in correspondence to gradation values of pixels (dots) for images that are to be recorded by ejected ink drops. Even during periods in which no ink drops are ejected, ink is present within the ink ejection nozzles 521, so that ink levels Ls have been formed in the nozzle holes 521*h* by action of atmospheric pressure and ink's surface tension. The piezoelectric elements 526 may be replaced with other vibrating elements.

The controller 7 is enabled to execute pre-ejection vibrations for, at a start time of ink ejection through the ink ejection nozzles 521, vibrating liquid levels Ls of ink within the ink ejection nozzles 521 without executing ink ejection. Subsequent to execution of the pre-ejection vibrations, the controller 7 further controls the head driving part 53 so as to make ink ejection executed.

Figure 5:
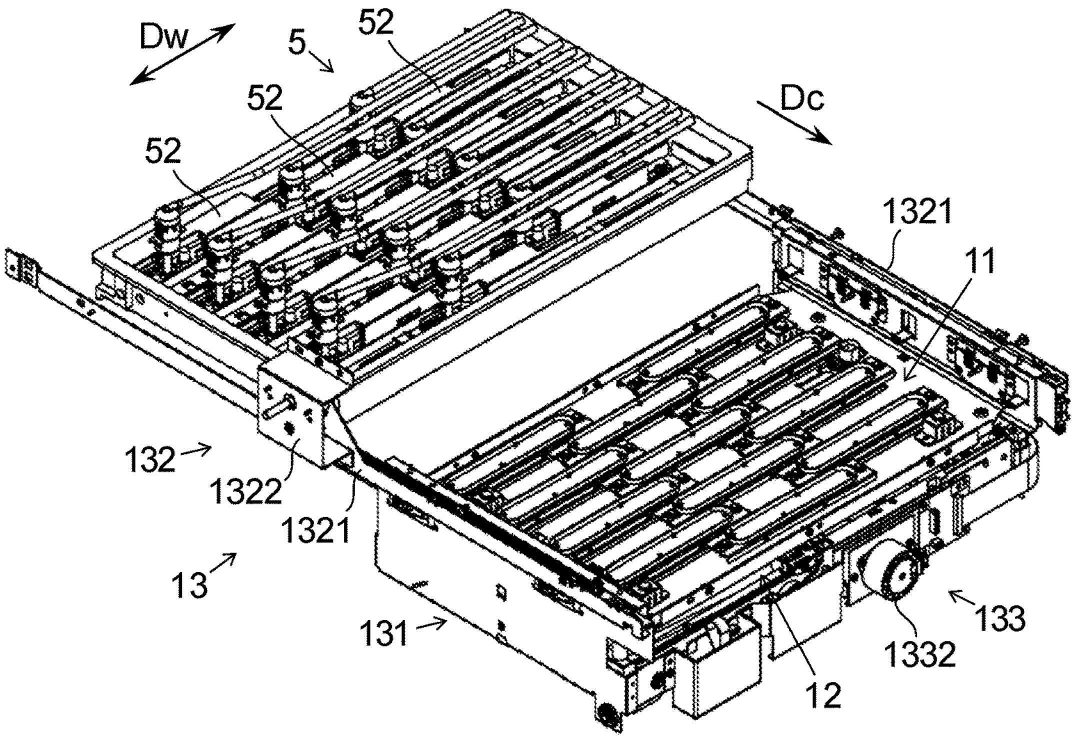
FIG. 5 is a perspective view of the recording part, a cap unit, and a maintenance unit in the inkjet recording apparatus of FIG. 1.
Figure 6:
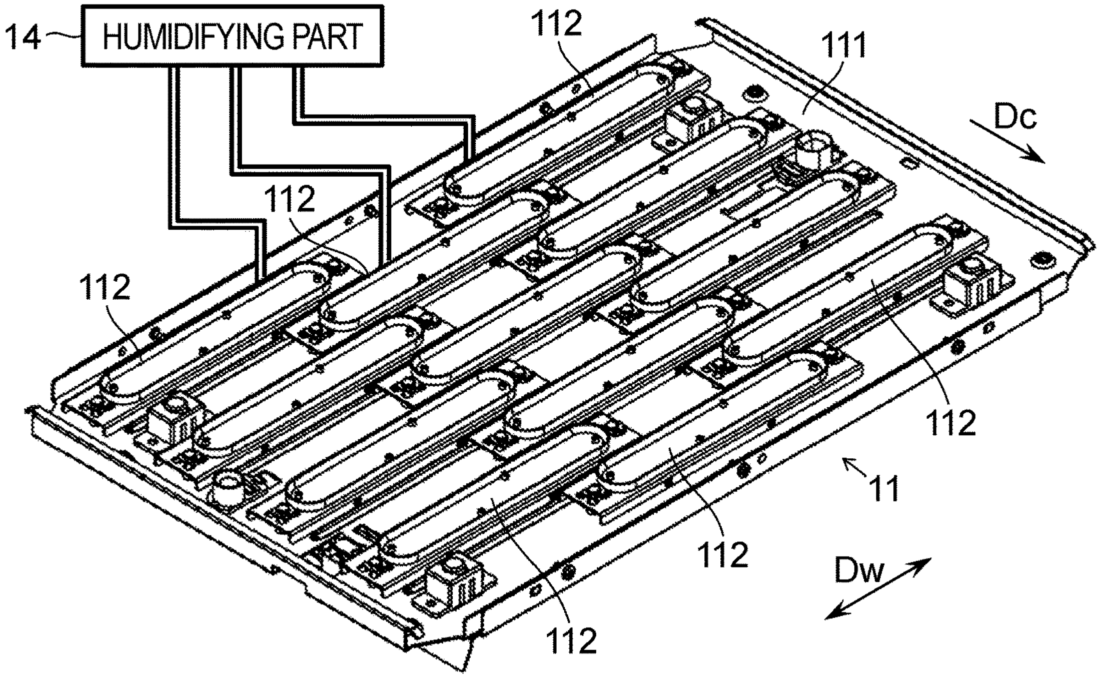
FIG. 6 is a perspective view of the cap unit of FIG. 5.
Figure 7:
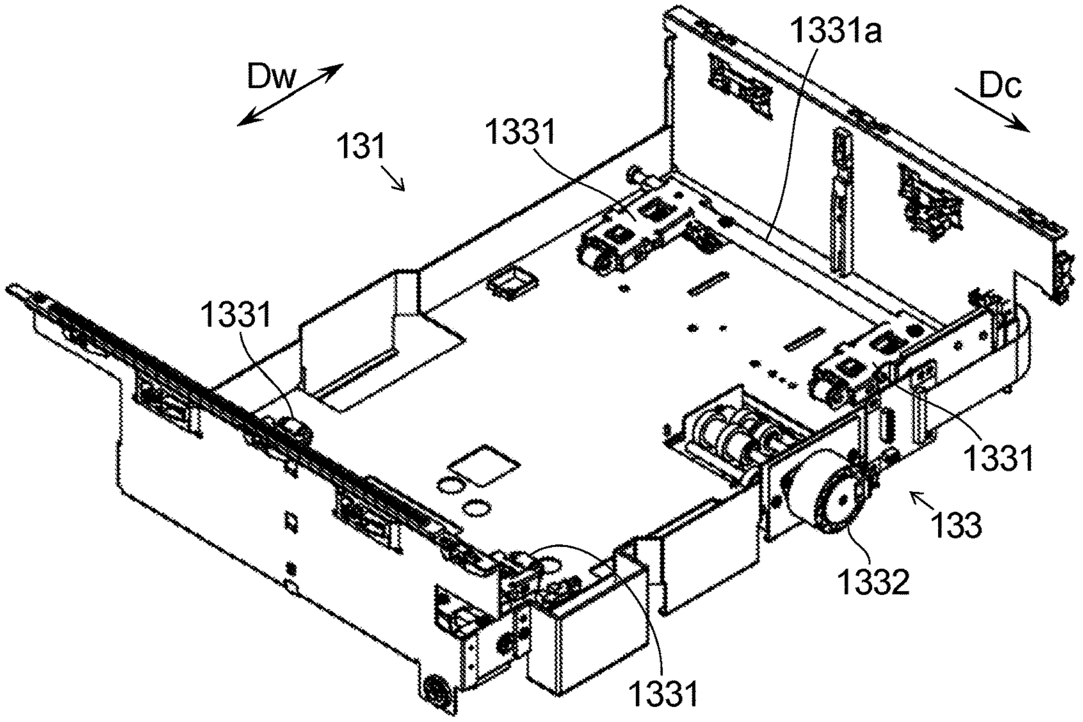
FIG. 7 is a perspective view of a carriage of FIG. 5.

As shown in FIGS. 1 and 3, the inkjet recording apparatus 1 includes a cap unit (cap member) 11, a maintenance unit 12, a unit moving mechanism (cap moving mechanism) 13, and a humidifying part 14. FIG. 5 is a perspective view of the recording part 5, the cap unit 11, and the maintenance unit 12 in the inkjet recording apparatus 1 of FIG. 1. FIG. 6 is a perspective view of the cap unit 11 of FIG. 5. FIG. 7 is a perspective view of a carriage 131 of FIG. 5.

As shown in FIG. 1, the cap unit 11 and the maintenance unit 12 are placed at a first position under the second belt conveyance part 42. For execution of capping for the ink ejection surface 52F and maintenance process of the recording heads 52, the cap unit 11 and the maintenance unit 12 can be moved individually to a second position under the recording part 5. As far as the cap unit 11 is concerned, the first position is a non-capping position in which the cap unit 11 has been retracted from the ink ejection surface 52F, while the second position is a capping position in which the cap unit 11 covers the ink ejection surface 52F.

The cap unit 11 is placed in the capping position with the ink ejection surface 52F thereby covered, and is set on a lower surface of the recording part 5. The cap unit 11 is removably settable to the ink ejection surface 52F so as to cover the ink ejection surface 52F. As a result, the cap unit 11 suppresses drying and thickening of ink within the ink ejection nozzles 521. The cap unit 11 includes a tray 111 and cap parts 112.

The tray 111 is formed into a rectangular shape extending horizontally in the sheet conveyance direction Dc and the sheet widthwise direction Dw. The cap parts 112 are placed on an upper surface of the tray 111. The cap parts 112 are placed at positions corresponding to plural recording heads 52*a*, 52*b*, 52*c* that are arranged in a staggered shape on an individual-color basis along the sheet widthwise direction Dw. That is, in this embodiment, the cap unit 11 includes twelve cap parts 112. Each cap part 112 is formed into a downwardly recessed shape. When the cap unit 11 is set to a capping position with the ink ejection surface 52F thereby covered, a bottom portion of each recording head 52 enters inward of the cap part 112, with the result that the cap part 112 is internally blocked.

The maintenance unit 12 is placed in the second position under the recording part 5, and set on the lower surface of the recording part 5. With this arrangement, the maintenance unit 12 executes, for example, wiping of the ink ejection surface 52F by a wiper (not shown), collection of liquid after wiping, and the like to eliminate ink fixed on the ink ejection surface 52F.

The unit moving mechanism 13 is placed under the recording part 5 and the drying part 6. The unit moving mechanism 13 includes the carriage 131, a horizontal moving mechanism 132, and an up/down moving mechanism 133, and supports the cap unit 11 and the maintenance unit 12.

The carriage 131 is supported by the horizontal moving mechanism 132. The carriage 131, which is formed into a rectangular-parallelepiped box shape with its upper surface opened, contains the maintenance unit 12 inside. The carriage 131 further holds the up/down moving mechanism 133.

The horizontal moving mechanism 132 includes guide rails 1321 and a motor 1322.

The guide rails 1321, which are placed on one end side and the other end side, respectively, of the sheet widthwise direction Dw, extend horizontally along the sheet conveyance direction Dc from under the recording part 5 to under the drying part 6. The cap unit 11 and the maintenance unit 12 are supported by the guide rails 1321 so as to be movable horizontally along the guide rails 1321. In addition, the cap unit 11 is supported independently upward of the carriage 131 (maintenance unit 12).

The motor 1322 is placed in adjacency to a guide rail 1321, and an output shaft of the motor 1322 is coupled to the cap unit 11 and the carriage 131 (maintenance unit 12) via gears or wire and pulley (neither shown). When the motor 1322 is driven, the horizontal moving mechanism 132 moves the cap unit 11 and the carriage 131 (maintenance unit 12) horizontally along the sheet conveyance direction Dc. The horizontal moving mechanism 132 is enabled to horizontally move the cap unit 11 and the carriage 131 (maintenance unit 12), individually.

The up/down moving mechanism 133 includes support members 1331 and a motor 1332.

The support members 1331 are placed at four locations, respectively, of inner bottom portions of the carriage 131. Each support member 1331 extends in the sheet widthwise direction Dw, and has one end portion immobilized to a rotating shaft 1331*a* extending in the sheet conveyance direction Dc so that the support member 1331 is rotatable about an axis line of the rotating shaft 1331*a*. The other end portion of the support member 1331 in the sheet widthwise direction Dw is put into contact with a bottom portion of the maintenance unit 12. In addition, the support member 1331 is immobilized to one rotating shaft 1331*a* at two places on one end side and the other end side of the sheet conveyance direction Dc. In the up/down moving mechanism 133, such a member in which two support members 1331 are immobilized to one rotating shaft 1331*a* is provided on one end side and the other end side, respectively, of the sheet widthwise direction Dw. That is, four support members 1331 are put into contact with the bottom portion of the maintenance unit 12.

The motor 1332 is placed on one end side of the carriage 131 in the sheet conveyance direction Dc, and an output shaft of the motor 1332 is coupled to two rotating shafts 1331*a* via gears or wire and pulley (neither shown). When the motor 1332 is driven, the up/down moving mechanism 133 rotates the four support members 1331 each about the axis line of the rotating shaft 1331*a* to push up or down the maintenance unit 12, thereby moving up or down the cap unit 11 and the maintenance unit 12. It is noted that the cap unit 11 is moved up or down by the up/down moving mechanism 133 via the maintenance unit 12.

In the way as described above, the unit moving mechanism 13 moves the cap unit 11 and the maintenance unit 12 selectively between the first position under the second belt conveyance part 42 and the second position under the recording part 5. That is, the unit moving mechanism 13 moves the cap unit 11 selectively between the capping position in which the ink ejection surface 52F is thereby covered, and the non-capping position in which the cap unit 11 is retracted from the ink ejection surface 52F. In this process, the first belt conveyance part 41, which is opposed to the lower surface of the recording part 5, is moved down by other up/down moving mechanism or the like. Operations of the unit moving mechanism 13 are controlled by the controller 7.

The humidifying part 14 is connected to each of plural cap parts 112 in the cap unit 11. In addition, the humidifying part 14 is depicted as connected only to three cap parts 112 in FIG. 6 for explanation's sake. However, actually, the humidifying part 14 is connected to all of twelve cap parts 112. The humidifying part 14 includes a vapor generating part 141.

The vapor generating part 141 includes, for example, a heater and a liquid storage tank (neither shown). The heater is placed in adjacency to the storage tank. The storage tank and the cap parts 112 are connected to each other by tubing. The vapor generating part 141 heats liquid within the storage tank by the heater to generate vapor of the liquid. The humidifying part 14 feeds vapor into the cap parts 112 via tubing to humidify interior of the cap parts 112. Operations of the humidifying part 14 are controlled by the controller 7.

Then, after an end of ink ejection from the ink ejection nozzles 521 as a result of, for example, ending of a print job, when a predetermined standard period has elapsed, the controller 7 makes the cap unit 11 set on the lower surface of the recording part 5 to cover the ink ejection surface 52F, fulfilling capping of the ink ejection surface 52F. Thus, the inkjet recording apparatus 1 suppresses thickening of ink within the ink ejection nozzles 521.

In this connection, the standard period from an end of ink ejection until issue of a capping instruction by the controller 7 is predetermined and stored in the storage part 8 or the like. However, a non-capping period from an end of ink ejection until a transition to capping, actually, may differ from the above-mentioned standard period because of resupply and replacement of sheets S or ink, troubleshooting, maintenance process and the like.

Then, in response to respective lengths of the non-capping period and the capping period within a duration from an end of ink ejection ejected from the ink ejection surface 52F until a start of next ink ejection, the controller 7 sets numbers of pre-ejection vibrations (not vibration frequency) in the ink ejection nozzles 521 at a start time of next ink ejection. In this process, the controller 7 uses a non-capping period table 81 and a capping period table 82 both previously stored in the storage part 8 as control tables related to operations of the head driving part 53 and the unit moving mechanism 13. FIG. 8 is a view showing an example of the non-capping period table 81. FIG. 9 is a view showing an example of the capping period table 82.

In the non-capping period table 81, as shown in FIG. 8, elapsed time t (non-capping period) counted from an end of ink ejection and number Y of pre-ejection vibrations in the ink ejection nozzles 521 at a start time of next ink ejection are stored with their respective data given in correspondence therebetween. As indicated by FIG. 8, it is assumed that the longer the elapsed time t counted from an end of ink ejection becomes, i.e., the longer the open-state period of the ink ejection nozzles 521 becomes, the more the drying and thickening of ink in the ink ejection nozzles 521 progresses, necessitating a larger number Y of pre-ejection vibrations in the ink ejection nozzles 521 at a start time of next ink ejection. That is, based on non-capping periods (elapsed time t) of the ink ejection surface 52F, the non-capping period table 81 increases the number Y of pre-ejection vibrations in the ink ejection nozzles 521 at a start time of next ink ejection.

In the capping period table 82, as shown in FIG. 9, elapsed time t (capping period) counted from a start of capping and number Y of pre-ejection vibrations in the ink ejection nozzles 521 at a start time of next ink ejection are stored with their respective data given in correspondence therebetween. As indicated by FIG. 9, it is assumed that the longer the elapsed time t counted from a start of capping becomes, the more the viscosity decrease of ink in the ink ejection nozzles 521 due to humidification within the cap parts 112 progresses, causing the number Y of pre-ejection vibrations in the ink ejection nozzles 521 at a start time of next ink ejection to decrease more and more. That is, based on capping periods (elapsed time t) of the ink ejection surface 52F, the capping period table 82 decreases the number Y of pre-ejection vibrations in the ink ejection nozzles 521 at a start time of next ink ejection.

With the above-described configuration, based on a non-capping period of the ink ejection surface 52F, i.e., in response to a progression extent of drying of ink in the ink ejection nozzles 521, the number Y of vibrations of ink levels in the ink ejection nozzles 521 at a start time of next ink ejection is increased. Also, based on a capping period of the ink ejection surface 52F, i.e., in response to a progression extent of humidification of ink in the ink ejection nozzles 521, the number Y of vibrations of ink levels in the ink ejection nozzles 521 at a start time of next ink ejection is decreased. As a result of this, ink viscosity in the ink ejection nozzles 521 can be held suitable in response to variations in wetness-and-dryness state of the ink ejection surface 52F, making it implementable to record high-quality images.

Also as described above, the humidifying part 14, including the vapor generating part 141 for generating vapor, feeds the vapor into the cap parts 112 of the cap unit 11. With this configuration, the ink ejection surface 52F can be suitably humidified by vapor. Hence, it becomes implementable to suppress thickening of ink in the ink ejection nozzles 521 as well as fixation of ink in the ink ejection surface 52F.

Next, modifications of the inkjet recording apparatus 1 will be described.

Figures 10, 11:
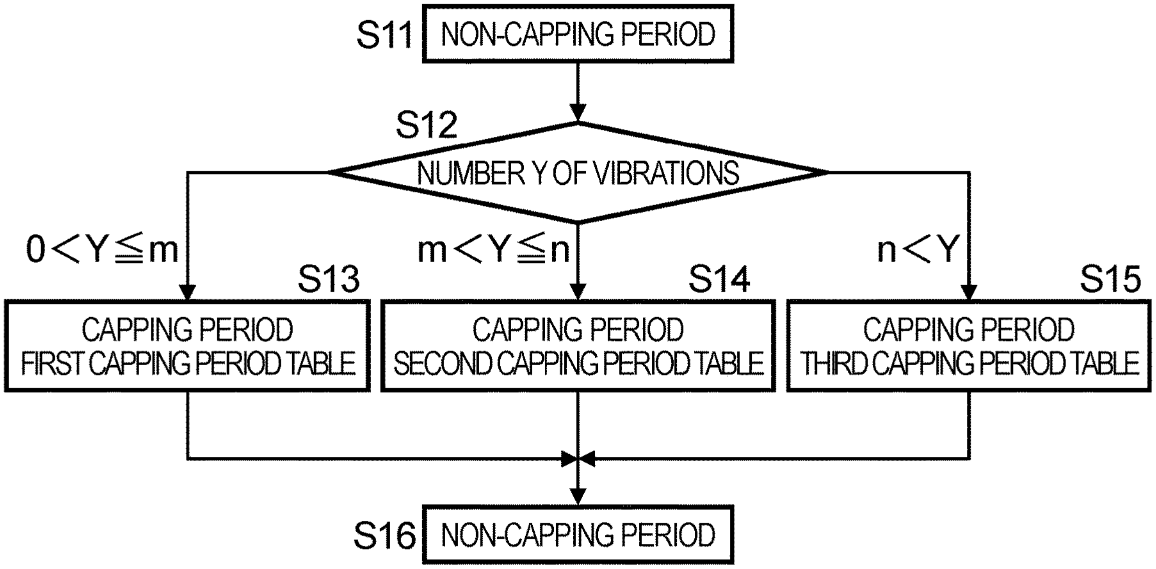
FIG. 10 is a flowchart showing a flow of operations related to capping in an inkjet recording apparatus according to Modification 1.
FIG. 11 is a view showing an example of a first capping period table of FIG. 10.

FIG. 10 is a flowchart showing a flow of operations related to capping in an inkjet recording apparatus according to Modification 1. FIGS. 11, 12 and 13 are views showing examples of a first capping period table 82A, a second capping period table 82B, and a third capping period table 82C, respectively, of FIG. 10.

The inkjet recording apparatus 1 of Modification 1 has previously stored, in the storage part 8, control tables including a plurality of capping period tables 82. The control tables include the first capping period table 82A, the second capping period table 82B, and the third capping period table 82C (see FIGS. 11, 12 and 13), where these capping period tables differ from one another in a ratio of the number Y of pre-ejection vibrations in the ink ejection nozzles 521 at a start time of next ink ejection relative to the capping period (elapsed time t). The elapsed time t until the number Y of pre-ejection vibrations reaches a zero increases more and more in an increasing order of the first capping period table 82A, the second capping period table 82B, and the third capping period table 82C.

In the inkjet recording apparatus 1 of Modification 1, at an end of a print job or the like as an example, an elapsed time t of a non-capping period from an end of ink ejection until capping is measured (step S11 in FIG. 10). Then, by using a non-capping period table (not shown in this case), the controller 7 sets a number Y of pre-ejection vibrations in the ink ejection nozzles 521 at a start time of next ink ejection (step S12 in FIG. 10).

Then, in correspondence to the setting of the number Y of next pre-ejection vibrations based on the subsequent capping period, the controller 7 selects one of the first capping period table 82A, the second capping period table 82B, and the third capping period table 82C on a basis of the number Y of pre-ejection vibrations acquired from the non-capping period table.

In the storage part 8, two threshold values m, n are previously stored in association with the number Y of pre-ejection vibrations acquired from the non-capping period table. For example, a threshold value m for the number of vibrations is 1500, and a threshold value n for the number of vibrations is 4500.

In terms of a number Y of next pre-ejection vibrations acquired from the non-capping period table, assuming that $0<Y\leq m$ (m=1500), the controller 7 uses the first capping period table 82A as the capping period table (step S13). Also, in terms of a number Y of next pre-ejection vibrations acquired from the non-capping period table, assuming that $m<Y\leq n$ (n=4500), the controller 7 uses the second capping period table 82B as the capping period table (step S14). Further, in terms of a number Y of next pre-ejection vibrations acquired from the non-capping period table, assuming that $n<Y$, the controller 7 uses the third capping period table 82C as the capping period table (step S15).

In addition, at steps S13, S14 and S15, the controller 7 counts from zero for measurement of the elapsed time t of the capping period. Then, based on a condition such as reception of an instruction for a print job or the like, or an arrival at an elapsed time t corresponding to number Y=0 of pre-ejection vibrations, the controller 7 cancels the capping state of the ink ejection surface 52F, starting a non-capping period (step S16 in FIG. 10).

With the above-described configuration, based on a non-capping period of the ink ejection surface 52F, i.e., in response to a progression extent of ink drying in the ink ejection nozzles 521, one of control tables that differ thereamong in setting of the number Y of next pre-ejection vibrations based on a subsequent capping period is selected. For example, in terms of the first capping period table 82A, the second capping period table 82B, and the third capping period table 82C as shown in FIGS. 11, 12 and 13, one capping period table is selected so that the longer the non-capping period (elapsed time t) of the ink ejection surface 52F becomes, the longer the period lasting until the number Y of next pre-ejection vibrations comes to a zero becomes. Therefore, pre-ejection vibrations suited to a wetness-and-dryness state of the ink ejection surface 52F can be imparted to the ink ejection nozzles 521 at a start time of next ink ejection.

Further, when a capping period is included during a period from an end of ink ejection from the ink ejection nozzles 521 until a start of next ink ejection as described above, the controller 7 provides the three periods of the first non-capping period, the capping period and the second non-capping period in this order to control operations of the unit moving mechanism 13. In connection with FIG. 10, the first non-capping period refers to the non-capping period of step S11, the capping period refers to the capping period of steps S13, S14 or S15, and the second non-capping period refers to the non-capping period of step S16.

Then, based on those three periods, the controller 7 sets a number Y of pre-ejection vibrations in the ink ejection nozzles 521 at a start time of next ink ejection. With this configuration, providing the capping period makes it possible to suppress thickening of ink in the ink ejection nozzles 521, and moreover providing the non-capping periods makes it possible to suppress excessive wetness of the ink ejection surface 52F. Accordingly, ink viscosity in the ink ejection nozzles 521 can be held suitable, making it implementable to record high-quality images.

FIGS. 14 and 15 are views showing examples of a capping period table 82D and a non-capping period table 81A, respectively, in an inkjet recording apparatus 1 according to Modification 2. In Modification 2, for example, in terms of setting for the number Y of pre-ejection vibrations in the ink ejection nozzles 521 at a start time of next ink ejection, which is involved in transition from a capping period to the second non-capping period in Modification 1 shown in FIG. 10, such control described below is executed.

In the inkjet recording apparatus 1 of Modification 2, based on a number Y of pre-ejection vibrations in the ink ejection nozzles 521 at a start time of next ink ejection, the number Y being acquired from the capping period table 82D at an end of the capping period, the controller 7 starts measurement of a subsequent non-capping period. For example, with use of the capping period table 82D shown in FIG. 14, assuming that the capping period (elapsed time t) is 3 seconds, the controller 7 acquires 1000 vibrations as a resultant number Y of next pre-ejection vibrations. Then, for measurement of a subsequent non-capping period, the controller 7 starts measurement of the elapsed time t of a non-capping period by starting with the number Y=1000 of vibrations of the non-capping period table 81A shown in FIG. 15, i.e., capping period (elapsed time t)=3 seconds.

As described above, for setting of the number Y of next pre-ejection vibrations based on the second non-capping period subsequent to a capping period, the controller 7 starts measurement of the second non-capping period by starting with measurement of an elapsed time t corresponding to the number Y of vibrations of the non-capping period table 81A identical in number to the number Y of vibrations acquired from the capping period table 82D. With this configuration, measurement of a non-capping period affecting the number Y of next pre-ejection vibrations is carried out in consideration of a humidified state of the ink ejection surface 52F during the capping period. Accordingly, pre-ejection vibrations more suitable for the wetness-and-dryness state of the ink ejection surface 52F can be imparted to the ink ejection nozzles 521 at a start time of next ink ejection.

Although an embodiment of this disclosure has been fully described hereinabove, yet the disclosure is not limited to the scope of this description and may be modified in various ways unless those modifications depart from the gist of the disclosure.

What is claimed is:

1. An inkjet recording apparatus comprising:

a recording head having an ink ejection surface in which nozzles for ejecting ink onto a recording medium are opened;

a head driving part for vibrating a liquid level of ink within each nozzle to generate ink drops;

a cap member which is settable to and removable from the ink ejection surface and which covers the ink ejection surface;

a humidifying part for humidifying interior of the cap member;

a cap moving mechanism for moving the cap member selectively between a capping position for coverage of the ink ejection surface and a non-capping position for retraction from the ink ejection surface;

a controller for controlling operations of the recording head, the head driving part, the humidifying part, and the cap moving mechanism; and a storage part for storing control tables related to operations of the head driving part and the cap moving mechanism, wherein the controller is enabled to execute pre-ejection vibrations for vibrating the liquid level to a specified times of vibrations without executing ink ejection at a start time of ink ejection from the nozzles, the control tables include a non-capping period table in which the number of vibrations is increased based on a non-capping period of the ink ejection surface and a capping period table in which the number of vibrations is decreased based on a capping period of the ink ejection surface, and in response to respective lengths of the non-capping period and the capping period from an end of ink ejection through the nozzles until a start of next ink ejection, the controller sets the number of vibrations for the pre-ejection vibrations at a start time of next ink ejection by using the non-capping period table and the capping period table.

2. The inkjet recording apparatus according to claim 1, wherein the control tables include a plurality of the capping period tables that differ thereamong in a ratio of the number of vibrations relative to the capping period, and in response to a setting of the number of vibrations based on the capping period, the controller selects one out of the plurality of capping period tables on a basis of the number of vibrations acquired from the non-capping period table.

3. The inkjet recording apparatus according to claim 1, wherein on condition that the capping period is included during a period from an end of ink ejection through the nozzles until a start of next ink ejection, the controller provides three periods of a first aforementioned non-capping period, the capping period, and a second aforementioned non-capping period, in this order, to control the cap moving mechanism, and moreover the controller sets the number of vibrations for the pre-ejection vibrations at a start time of next ink ejection.

4. The inkjet recording apparatus according to claim 3, wherein in response to a setting of the number of vibrations based on the second non-capping period, the controller starts measurement of the second non-capping period by starting with measurement of an elapsed time corresponding to the number of vibrations of the non-capping period table identical in number to the number of vibrations acquired from the capping period table.

5. The inkjet recording apparatus according to claim 1, wherein the humidifying part includes a vapor generating part for generating vapor, and feeds the vapor to within the cap member.

* * * * *